United States Patent
Pang et al.

(10) Patent No.: US 10,972,478 B2
(45) Date of Patent: Apr. 6, 2021

(54) DATA PROCESSING METHOD AND APPARATUS, TERMINAL, AND ACCESS POINT COMPUTER

(71) Applicant: CLOUDMINDS (SHANGHAI) ROBOTICS CO., LTD., Shanghai (CN)

(72) Inventors: Hongfu Pang, Shenzhen (CN); Min Chen, Shenzhen (CN); Yang Zhou, Shenzhen (CN)

(73) Assignee: CLOUDMINDS (SHANGHAI) ROBOTICS CO., LTD.

( * ) Notice: Subject to any disclaimer, the term of this patent is extended or adjusted under 35 U.S.C. 154(b) by 0 days.

(21) Appl. No.: 16/567,855

(22) Filed: Sep. 11, 2019

(65) Prior Publication Data
US 2020/0120105 A1    Apr. 16, 2020

(30) Foreign Application Priority Data

Oct. 15, 2018  (CN) .......................... 201811198956.1

(51) Int. Cl.
*H04L 29/06*    (2006.01)
*H04L 29/08*    (2006.01)

(52) U.S. Cl.
CPC ........ *H04L 63/108* (2013.01); *H04L 63/0442* (2013.01); *H04L 63/06* (2013.01);
(Continued)

(58) Field of Classification Search
CPC ... H04L 63/108; H04L 63/0442; H04L 63/06; H04L 63/08; H04L 67/141; H04L 63/1458
(Continued)

(56) References Cited

U.S. PATENT DOCUMENTS

| | | | |
|---|---|---|---|
| 9,083,581 B1* | 7/2015 | Addepalli | ............... G06F 9/542 |
| 2004/0168052 A1* | 8/2004 | Clisham | .............. H04W 12/001 |
| | | | 713/153 |

(Continued)

FOREIGN PATENT DOCUMENTS

| | | |
|---|---|---|
| CN | 106503995 A | 3/2017 |
| CN | 107528796 A | 12/2017 |

(Continued)

OTHER PUBLICATIONS

CSA—Cloud Security Alliance, "Software Defined Perimeter", © 2013 Cloud Security Alliance, pp. 1-13. https://cloudsecurityalliance.org/artifacts/software-defined-perimeter/.

(Continued)

*Primary Examiner* — Kevin T Bates
*Assistant Examiner* — Chen-Liang Huang
(74) *Attorney, Agent, or Firm* — Dilworth IP, LLC

(57) ABSTRACT

The present disclosure relates to a data processing method and apparatus, a terminal and an access point computer, which can achieve an effect that the terminal accesses multiple access points at the same time. The method includes: receiving an application access request; determining a target access point corresponding to the application access request according to a mapping relationship between the access point and an application server obtained from a blockchain network; sending a software defined perimeter SDP authentication request to the target access point; and after the SDP authentication succeeds, performing interaction of application data through a data channel established with the target access point, wherein the data channel has a period of validity of a preset time length.

4 Claims, 8 Drawing Sheets

(52) U.S. Cl.
CPC .......... *H04L 63/08* (2013.01); *H04L 67/141* (2013.01); *H04L 63/1458* (2013.01)

(58) Field of Classification Search
USPC ....................................................... 709/227
See application file for complete search history.

(56) References Cited

U.S. PATENT DOCUMENTS

| | | | |
|---|---|---|---|
| 2007/0162554 A1* | 7/2007 | Branda | H04L 63/062 |
| | | | 709/207 |
| 2007/0234428 A1 | 10/2007 | Rash | |
| 2017/0222992 A1* | 8/2017 | Adler | H04L 9/0841 |
| 2019/0207762 A1 | 7/2019 | Xie et al. | |
| 2019/0229900 A1* | 7/2019 | Khristi | H04L 67/02 |
| 2019/0377900 A1* | 12/2019 | Balzer | G06F 21/6254 |
| 2020/0034521 A1* | 1/2020 | Teng | H04W 12/06 |
| 2020/0119925 A1* | 4/2020 | Wang | H04L 9/0637 |
| 2020/0213329 A1* | 7/2020 | Simons | G06N 20/00 |

FOREIGN PATENT DOCUMENTS

| | | |
|---|---|---|
| CN | 107730280 A | 2/2018 |
| CN | 107980216 A | 5/2018 |
| WO | 2018087493 A1 | 5/2018 |

OTHER PUBLICATIONS

European Search Report dated Jan. 29, 2020 in Corresponding European Application No. 19195948.5, 11 pages.
Rosa Lucion, Everson L, et al., Software Defined Perimeter: Improvements in the security of Single Packet Authorization and user authentication, IEEE, 2018 XLIV Latin American Computer Conference (CLEI); 2018, pp. 108- 717.
First Office Action for Chinese Application No. 201811198956.1; dated Dec. 18, 2020; 9 pages.
European Office Action dated Jan. 29, 2021 in Corresponding European Application No. EP 19195948.5; 6 pages.

* cited by examiner

DATA PROCESSING METHOD AND APPARATUS, TERMINAL, AND ACCESS POINT COMPUTER

CROSS-REFERENCE TO RELATED APPLICATIONS

This application claims priority benefits to Chinese Patent Application No. 201811198956.1, filed on Oct. 15, 2018, the contents of which are incorporated herein by reference.

FIELD OF THE INVENTION

The present disclosure relates to the technical field of communication, and in particular, to a data processing method and apparatus, a terminal, and an access point computer.

BACKGROUND OF THE INVENTION

The software defined perimeter (Software Defined Perimeter, SDP) technology is a set of network security isolation framework that can be dynamically configured on demand and is formulated by the CSA (Cloud Security Alliance) to replace the traditional physical isolation facilities or devices. The SDP establishes a cryptographic-based perimeter protection mechanism, the perimeter that can be deployed anywhere, such as on a network, in a cloud, on a hosting center, on a private enterprise network, or deployed in these positions at the same time. Only devices authenticated and authorized by the SDP can access protected services and facilities, before any device is authenticated and authorized by the SDP, the protected services are invisible to attackers, and the attackers can hardly initiate attacks to the invisible services.

At present, the SDP technology can perform security access in a one-to-one manner, that is to say, a user terminal can only connect to one access point at the same time, and can only access the services protected by this access point at the same time. However, in practical applications, an enterprise may have many services and need to provide multiple access points, but the one-to-one traditional access manner cannot access all services of the enterprise at the same time. Or, multiple enterprises provide multiple services, and different enterprises need to provide different access points, but the one-to-one traditional access manner cannot access the different services of the different enterprises at the same time.

SUMMARY OF THE INVENTION

To overcome the problems in the related art, the present disclosure provides a data processing method and apparatus, a terminal, and an access point computer, which can achieve an effect that the terminal accesses multiple access points at the same time.

According to a first aspect of embodiments of the present disclosure, a data processing method is provided, applied to a terminal, including:

receiving an application access request;

determining a target access point corresponding to the application access request according to a mapping relationship between the access point and an application server obtained from a blockchain network;

sending a software defined perimeter SDP authentication request to the target access point; and after the SDP authentication succeeds, performing interaction of application data through a data channel established with the target access point, wherein the data channel has a period of validity of a preset time length.

According to a second aspect of the embodiments of the present disclosure, a data processing method is provided, applied to an access point, including:

receiving a software defined perimeter SDP authentication request sent by a terminal;

obtaining identity information of the terminal from the SDP request;

querying whether permission information allowing the terminal is stored in the blockchain network according to the identity information, the permission information is used for characterizing that the terminal is allowed to access the target access point;

determining that the SDP authentication is successful, when the permission information is queried in the blockchain network; and opening a port to the terminal to establish a data channel with the terminal, and performing interaction of application data through the data channel.

According to a third aspect of the embodiments of the present disclosure, a data processing apparatus, applied to a terminal, including:

a receiving module, configured to receive an application access request;

an access point determining module, configured to determine a target access point corresponding to the application access request according to a mapping relationship between the access point and an application server obtained from a blockchain network;

a sending module, configured to send a software defined perimeter SDP authentication request to the target access point; and a data interaction module configured to, after the SDP authentication succeeds, perform interaction of application data through a data channel established with the target access point, wherein the data channel has a period of validity of a preset time length.

According to a fourth aspect of the embodiments of the present disclosure, a data processing apparatus is provided, applied to an access point, including:

a receiving module, configured to receive a software defined perimeter SDP authentication request sent by a terminal;

an information obtaining module, configured to obtain identity information of the terminal from the SDP request;

a querying module, configured to query whether permission information allowing the terminal is stored in the blockchain network according to the identity information, the permission information is used for characterizing that the terminal is allowed to access the target access point;

a determining module, configured to determine that the SDP authentication is successful, when the permission information is queried in the blockchain network; and a port opening module, configured to open a port to the terminal to establish a data channel with the terminal, and perform interaction of application data through the data channel.

According to a fifth aspect of the embodiments of the present disclosure, a computer program product is provided, the computer program product includes a computer program executable by a programmable apparatus, and the computer program has a code part for executing the method in any item in the first aspect mentioned above when being executed by the programmable apparatus.

According to a sixth aspect of the embodiments of the present disclosure, a non-transitory computer readable storage medium is provided, the non-transitory computer readable storage medium includes one or more programs, and the one or more programs are used for executing the method in any item in the first aspect mentioned above.

According to a seventh aspect of the embodiments of the present disclosure, a terminal is provided, including a non-transitory computer readable storage medium; and one or more processors for executing programs in the non-transitory computer readable storage medium; and the non-transitory computer readable storage medium stores instructions for executing the method of the first aspect mentioned above of the claims.

According to an eighth aspect of the embodiments of the present disclosure, an access point computer is provided, including a non-transitory computer readable storage medium; and one or more processors for executing programs in the non-transitory computer readable storage medium; and the non-transitory computer readable storage medium stores instructions for executing the method of the second aspect mentioned above.

The technical solutions provided by the embodiments of the present disclosure can include the following beneficial effects:

In the embodiments of the present disclosure, the terminal can obtain the mapping relationship between the access point and the application server from the blockchain network, then, after receiving the application access request, the terminal can determine the target access point corresponding to an application to be accessed according to the obtained mapping relationship, and then send the SDP authentication request to the target access point, and after the SDP authentication succeeds, the terminal can perform the interaction of the application data through the established data channel with the period of validity of the preset time length. In this way, since the data channel established after the SDP authentication succeeds has the period of validity, there is substantially no continuously connected data channel between the terminal and the access point, so the terminal can establish data channels with multiple access points at the same time, meanwhile, an SDP controller is achieved by using a blockchain, so that the centralization problem of the SDP controller can be solved, the single point of failure is prevented, and the DDoS (Distributed Denial of Service) attack and the like is defended.

BRIEF DESCRIPTION OF THE DRAWINGS

The drawings are used for providing a further understanding of the present disclosure and constitute a part of the specification. The drawings, together with the following specific embodiments, are used for explaining the present disclosure, but are not intended to limit the present disclosure. In the drawings.

DETAILED DESCRIPTION OF THE EMBODIMENTS

The specific embodiments of the present disclosure will be described in detail below in combination with the drawings. It should be understood that the specific embodiments described herein are merely used for illustrating and explaining the present disclosure, rather than limiting the present disclosure.

Figure 1:
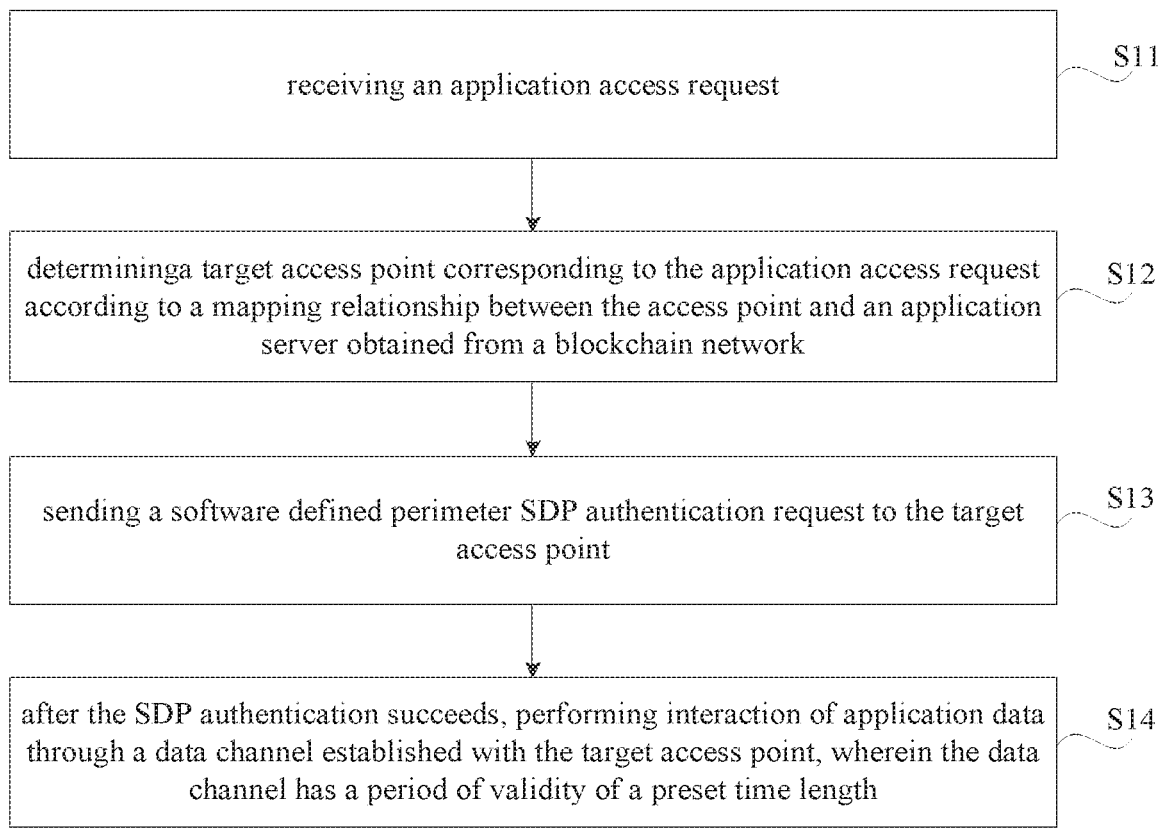
FIG. 1 is a flow diagram of a data processing method applied to a terminal shown according to an exemplary embodiment.

Please refer to FIG. 1. FIG. 1 is a flow diagram of a data processing method applied to a terminal shown according to an exemplary embodiment. As shown in FIG. 1, the method includes the following steps.

Step S11: receiving an application access request;

step S12: determining a target access point corresponding to the application access request according to a mapping relationship between the access point and an application server obtained from a blockchain network;

step S13: sending a software defined perimeter SDP authentication request to the target access point; and step S14: after the SDP authentication succeeds, performing interaction of application data through a data channel established with the target access point, wherein the data channel has a period of validity of a preset time length.

The blockchain (Blockchain) technology refers to a technical solution of collectively maintaining a reliable database in a decentralization and de-trust manner, in a network composed of the solution, any node is not central and untrusted, any node has an account describing its identity, and the account consists of a public and private key pair. In the embodiment of the present disclosure, the information of each access point in the network and the mapping relationship between the access point and the application server can be stored in the blockchain network, and the terminal can obtain the mapping relationship from the blockchain network at any time, so that a user can access different application servers. The manner of the terminal to obtain the information stored in the blockchain is not limited in the present disclosure, the information can be periodically updated from the blockchain network to the terminal local, or updated information can be obtained from the blockchain network when the information of the blockchain network is updated, or, the corresponding information can also be obtained from the blockchain network in view of the request of the user after the user initiates the application access request, etc.

The application access request can be a request initiated by the user of the terminal to access a certain application, such as a request for accessing an XX news application, and the like. After the application access request of the user is received, the target access point corresponding to the application server requested by the user for accessing can be found according to the mapping relationship between the access point and the application server obtained from the blockchain network, and the SDP authentication is performed on the target access point.

Figure 2:
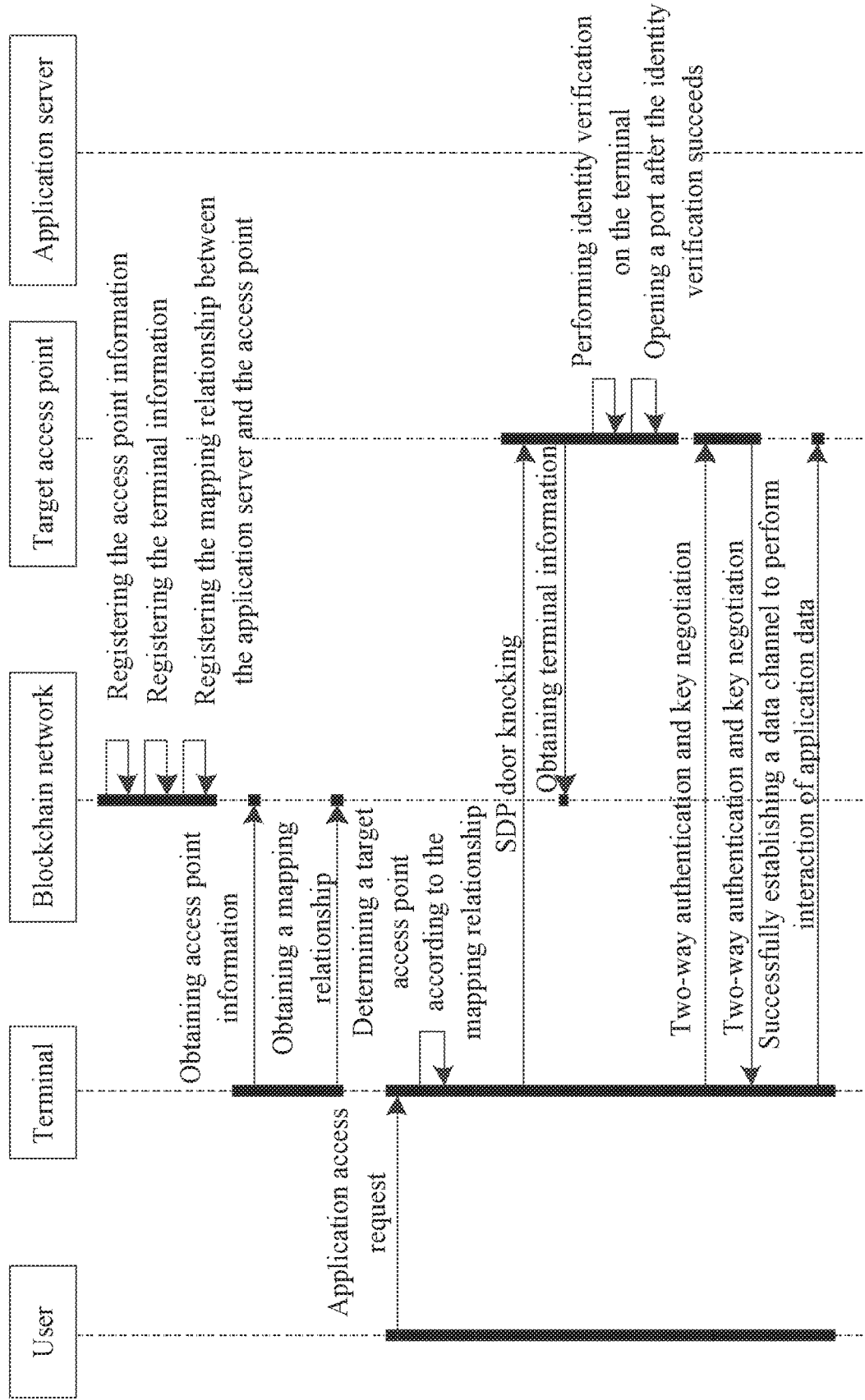
FIG. 2 is an interaction schematic diagram of a data processing method shown according to an exemplary embodiment.

FIG. 2 is an interaction schematic diagram of a data processing method shown according to an exemplary embodiment, as shown in FIG. 2, for the blockchain network, access point information, terminal information, the mapping relationship between the application server and the access point and other information can be updated periodically or irregularly. In a possible implementation manner, the access point information can include a public key of the access point, an IP address and port information, so that the terminal can obtain the IP address and the port information of the target access point to be accessed, and then initiate the SDP authentication request. The terminal information can include the authority of the terminal for judging whether the terminal is allowed to establish a link with the access point. The mapping relationship between the application server and the access point includes, for example, "www.baidu.com" corresponds to "222.222.222.1" (that is, the access point with the IP 222.222.222.1 is required to access the baidu); "58.58.58.58" corresponds to "222.222.222.2" (that is, the access point with the IP 222.222.222.2 is required to access 58.58.58.58); and "192.168.1.1" corresponds to "222.222.222.3" (that is, the access point with the IP 222.22.222.3 is required to access 192.168.1.1).

The terminal can obtain the access point information and the mapping relationship between the access point and the application server from the blockchain network to the local, and when the user accesses a certain application server through the terminal (i.e., initiates the application access request), the terminal collects the information of the application server, and can obtain the target access point that is required to access the application server according to the mapping relationship. The terminal sends the SDP authentication request to the target access point, that is, performs SDP door knocking on the target access point, after receiving an SDP door knocking packet, the target access point extracts the terminal information from the SDP door knocking packet after being verified by an SDP protocol, and then verifies whether the terminal has permission to allow access from the blockchain network, if the verification is passed, the port can be opened to the terminal, and the data channel for the interaction of the application data is established, and the channel has the period of validity with the preset time length, for example, the preset time length is set as 60 seconds and the like, and this is not limited in the embodiment of the present disclosure.

In a possible implementation manner, after the interaction of the application data is performed through the data channel established with the target access point, the method further includes:

when the application access request is received again, if the data channel is not out of date, performing the interaction of the application data through the data channel; or when the application access request is received again, if the data channel is out of date, re-executing the step of sending the software defined perimeter SDP authentication request to the target access point to re-establish the data channel.

That is to say, once the data channel exceeds the period of validity, when the application access request for the same target access point is received again, the SDP door knocking is performed again, and the previous SDP authentication step is repeated. Therefore, in the embodiment of the present disclosure, the terminal and the target access point do not establish a continuously connected data channel, therefore, the terminal can simultaneously access the application servers of different access points, and only needs to establish the data channels having the periods of validity with the different access points.

In a possible implementation manner, the method further includes:

determining a key for performing data interaction with the target access point; and the performing interaction of application data through a data channel established with the target access point includes:

using the key to send encrypted application data to the target access point through the data channel.

In a possible implementation manner, the determining a key for performing data interaction with the target access point includes:

if the terminal locally stores the key and the key is not out of date, determining the locally stored key as the key for performing data interaction with the target access point; or, if the key stored locally by the terminal is out of date or the key is not stored locally, negotiating the key with the target access point, determining the negotiated key as the key for performing data interaction with the target access point, and storing the key in the local of the terminal.

In order to implement secure data transmission, the data transmitted through the data channel need to be encrypted by the key, the key is generated by the key negotiation between the terminal and the access point after the two-way authentication succeeds, the key has a period of validity, the terminal and the access point can directly use the locally stored key to encrypt the data to be transmitted within the period of validity, and if the key exceeds the period of validity, the terminal and the access point need to perform the key negotiation again to re-determine the key. For the specific period of validity of the key, it is not limited in the embodiment of the present disclosure, for example, set as 3600 seconds, or 5400 seconds, and the like.

Please continue to refer to FIG. 2, after the terminal sends the SDP door knocking packet, the access point verifies whether the terminal has the permission information, if there is no key or the key is out of date at this time, the terminal can try to perform two-way authentication and key negotiation with the access point, and if the two-way authentication succeeds and the key negotiation succeeds, the secure data channel for performing the interaction of the application data is successfully established.

In a possible implementation manner, when the key negotiation is performed, the terminal can perform key negotiation with the target access point through a public key of the target access point included in the obtained access point information:

performing identity authentication on the target access point by using the public key of the target access point;

when the identity authentication of the target access point is passed, the identity authentication of the target access point on the terminal is passed, and the target access point confirms that the blockchain network stores the permission information of the terminal, generating the key to complete the key negotiation;

wherein the permission information is used for characterizing that the terminal is allowed to access the target access point, and the permission information is stored in the blockchain network, and the access point can query whether the terminal is allowed to access through the blockchain network.

Before the key is generated, the terminal and the target access point perform the two-way identity authentication, and only when the identity authentication succeeds, the key is generated and stored. When the identity authentication is performed, a public key of the access point in the access point information of the target access point obtained from the blockchain network is used. For example, the process of the two-way identity authentication can be: the terminal sends information including the public key of the terminal and a random number 1 to the target access point; the target access point signs the random number 1 with its own private key and sends back the signed random number 1 and a generated random number 2 to the terminal; the terminal decrypts the signed random number 1 with the public key of the target access point, signs the random number 2 with the private key of the terminal, and sends the signed random number 2 to the target access point; and the target access point decrypts the signed random number 2 with the public key of the terminal, furthermore, the target access point verifies whether the terminal has the permission information from the blockchain network based on the public key of the terminal, if the verification is passed, the target access point feeds back information indicating that the verification is passed to the terminal, and the two-way authentication is completed at this time. Of course, if any of the above steps fails, for example, when the terminal or the target access point fails to decrypt the random number, or if there is no permission information of the terminal in the blockchain network, and the like, the two-way authentication is deem to fail.

After the two-way authentication is passed, the terminal can generate the key and start timing the period of validity of the key, after the key is sent to the target access point, the key negotiation is completed, in the subsequent application data interaction process, the key can be used for encrypting the application data, secure transmission of data is achieved in the established data channel, and after the period of validity of the key is out of date, the two-way identity authentication and the key negotiation can be re-executed through the above steps.

It should be understood that, in the embodiment of the present disclosure, the established data channel has a period of validity (for example, set as 60 seconds), and the key used for application data transmission has a period of validity (for example, set as 3600 seconds), after the arrival of the period of validity of the data channel, the SDP door knocking needs to be implemented again to transmit the data, that is, the SDP authentication is performed again, and if the key is not out of date at this time, the key negotiation does not need to be performed again; and after the SDP door knocking is performed, if there is no key or the key is out of date, the two-way authentication and the key negotiation need to be performed.

Figure 3:
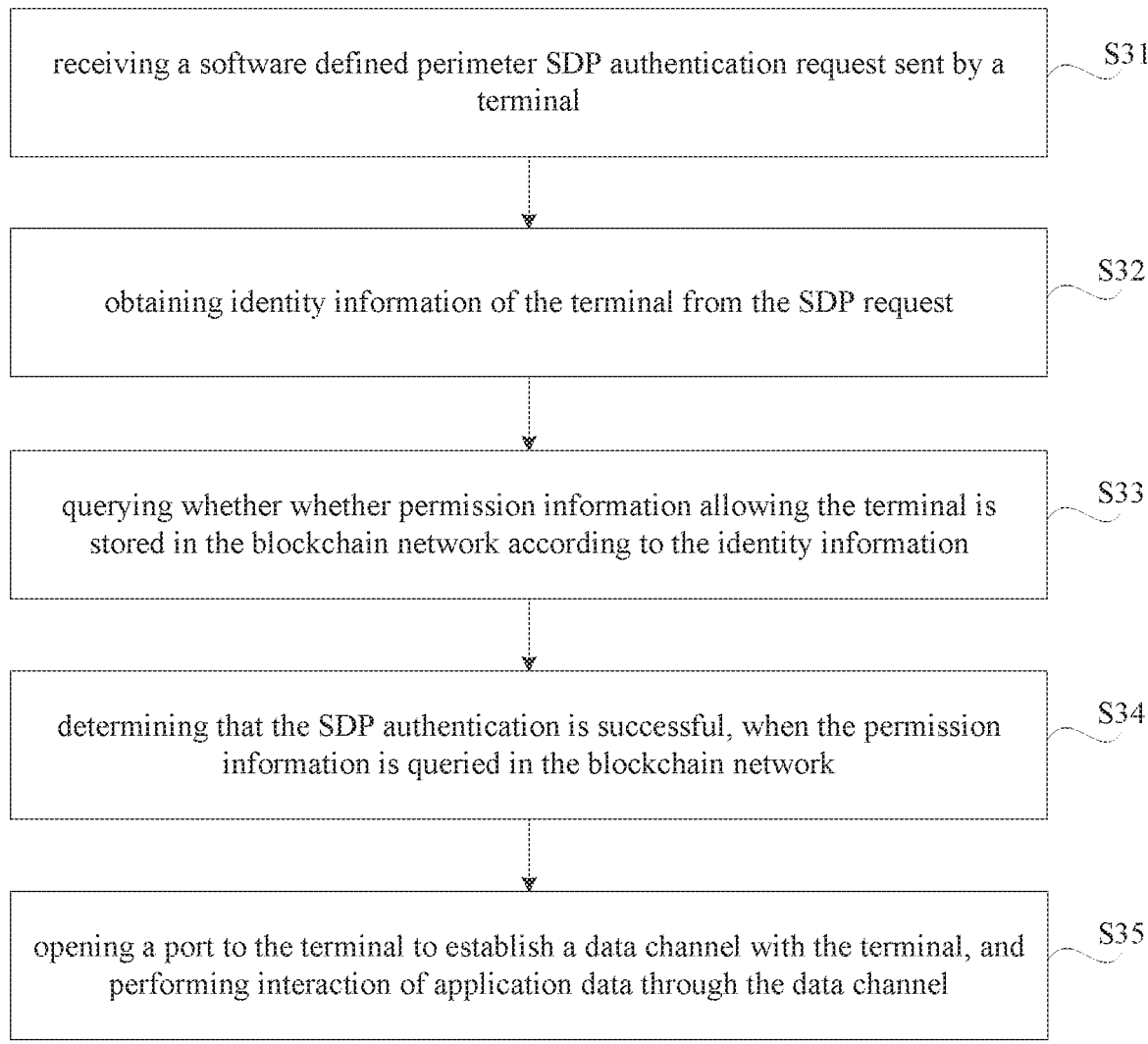
FIG. 3 is a flow diagram of a data processing method applied to an access point shown according to an exemplary embodiment.

Please refer to FIG. 3, FIG. 3 is a flow diagram of a data processing method applied to an access point shown according to an exemplary embodiment. As shown in FIG. 3, the method includes the following steps.

Step S31: receiving a software defined perimeter SDP authentication request sent by a terminal;

step S32: obtaining identity information of the terminal from the SDP request;

step S33: querying whether permission information allowing the terminal is stored in the blockchain network according to the identity information, wherein the permission information is used for characterizing that the terminal is allowed to access the target access point;

step S34: determining that the SDP authentication is successful, when the permission information is queried in the blockchain network; and step S35: opening a port to the terminal to establish a data channel with the terminal, and performing interaction of application data through the data channel.

In a possible implementation manner, the opening a port to the terminal includes:

opening the port to the terminal, and setting an open period of the port, so that the data channel has a period of validity of a preset time length; and wherein, after the data channel is out of date, the terminal needs to perform the SDP authentication again.

In the embodiment of the present disclosure, the specific embodiment of the data processing method applied to the access point side has been described in the foregoing method on the terminal side, for details, reference can be made to the description of the related parts above, and details are not described herein again.

The present disclosure will be described below by way of a complete embodiment.

Figure 4:
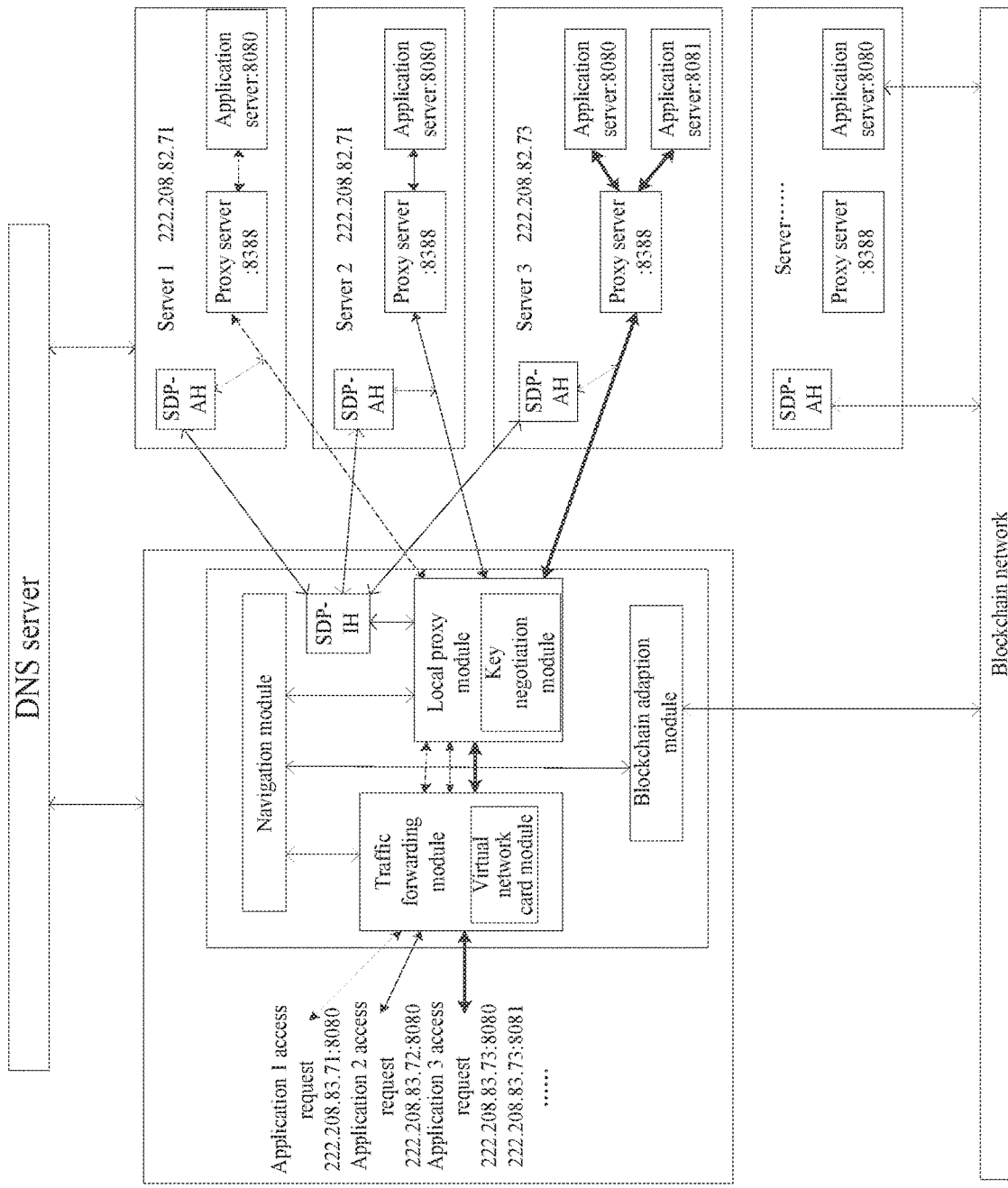
FIG. 4 is a schematic diagram for implementing security multichannel transmission shown according to an exemplary embodiment.

As shown in FIG. 4, the software on the terminal side can at least include a navigation module, a traffic forwarding module, an SDP module, a local proxy module and a blockchain adaptation module, the interception of application access request information and traffic is implemented by the traffic forwarding module, and the traffic is forwarded to the local proxy module. The local proxy module guides the traffics accessed by different applications to different access points (SDP-AH) based on the mapping relationship between the access point and the application server. Door knocking and the establishment of a security channel are implemented by an SDP starting host module (SDP-IH), and multiple secure channels are implemented through the local proxy module. When the terminal is initialized, the navigation module obtains the information of the application server and DNS server information from the network through the blockchain adaptation module, and configures a virtual network card module based on the obtained information.

Figure 5:
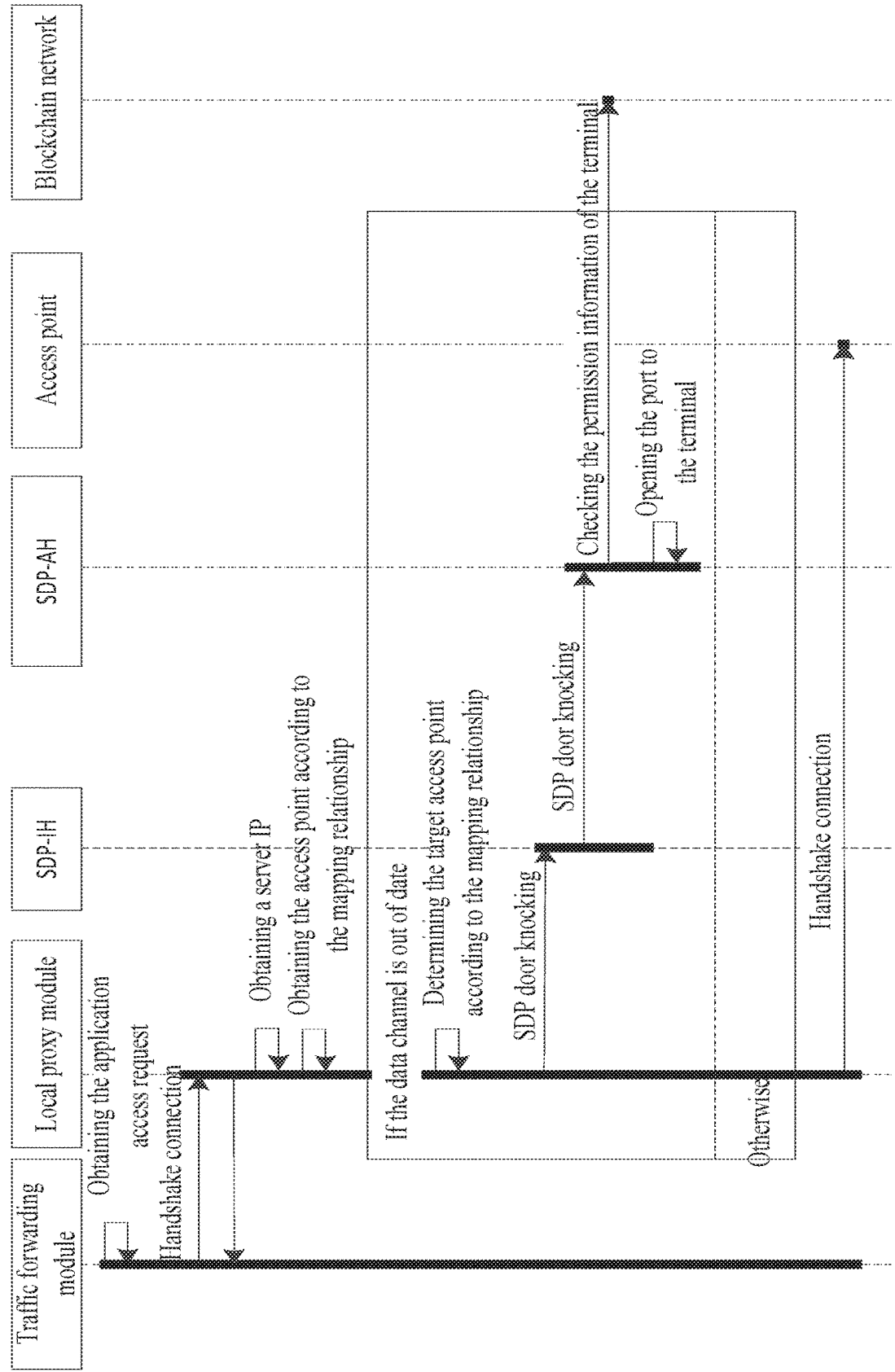
FIG. 5 is a schematic diagram of SDP authentication shown according to an exemplary embodiment.
Figure 6:
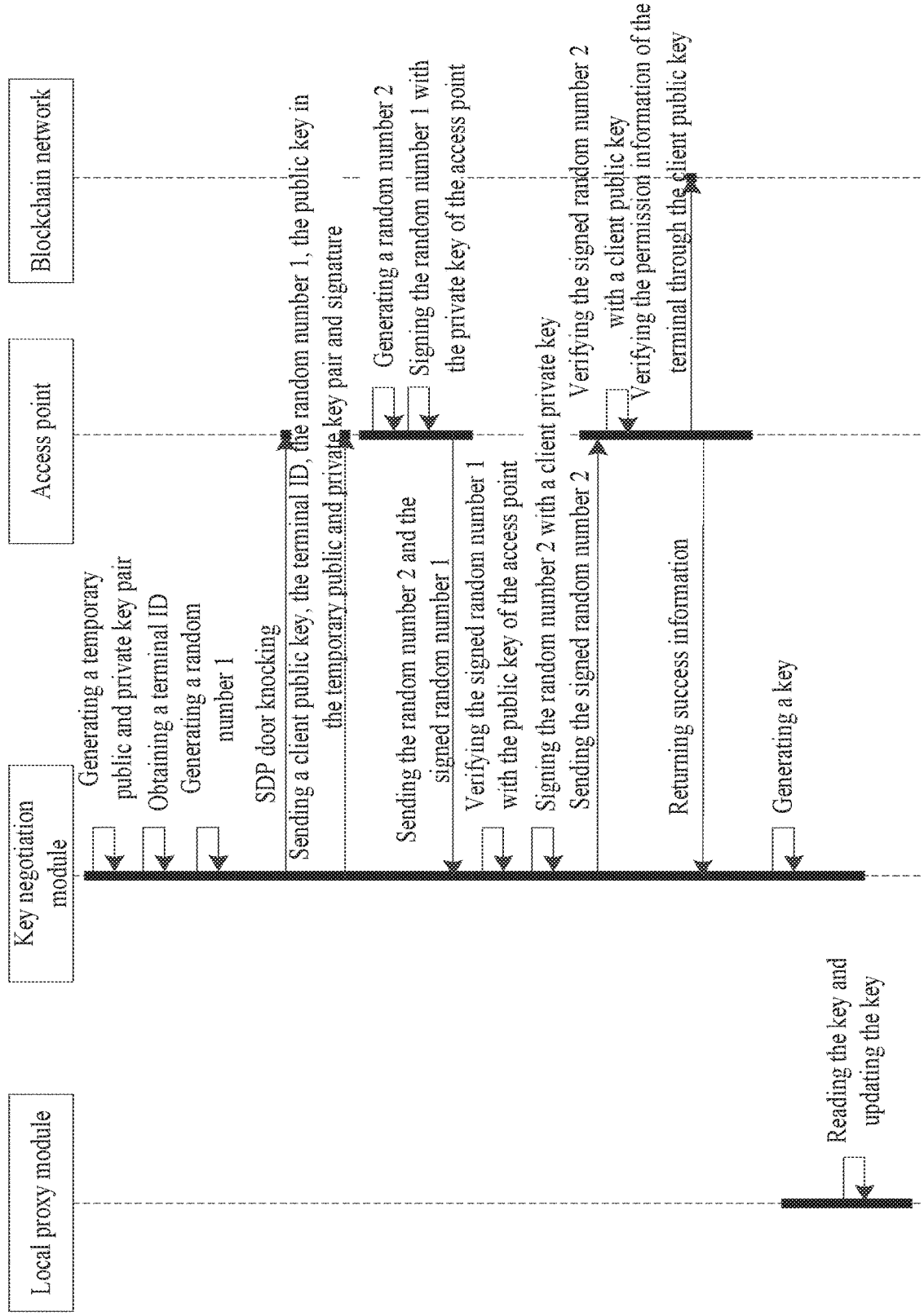
FIG. 6 is a schematic diagram of a key negotiation process shown according to an exemplary embodiment.

Continuing to refer to FIG. 5 to FIG. 6, FIG. 5 is a schematic diagram of the local proxy module to implement the door knocking of the target access point, FIG. 6 is a schematic diagram of a key negotiation process, and when the key is not out of date, the key negotiation process in FIG. 6 does not need to be implemented. After the key negotiation is completed, when the interaction of application data is performed subsequently, the negotiated key can be used for encryption to implement the secure transmission of the data.

Figure 7:
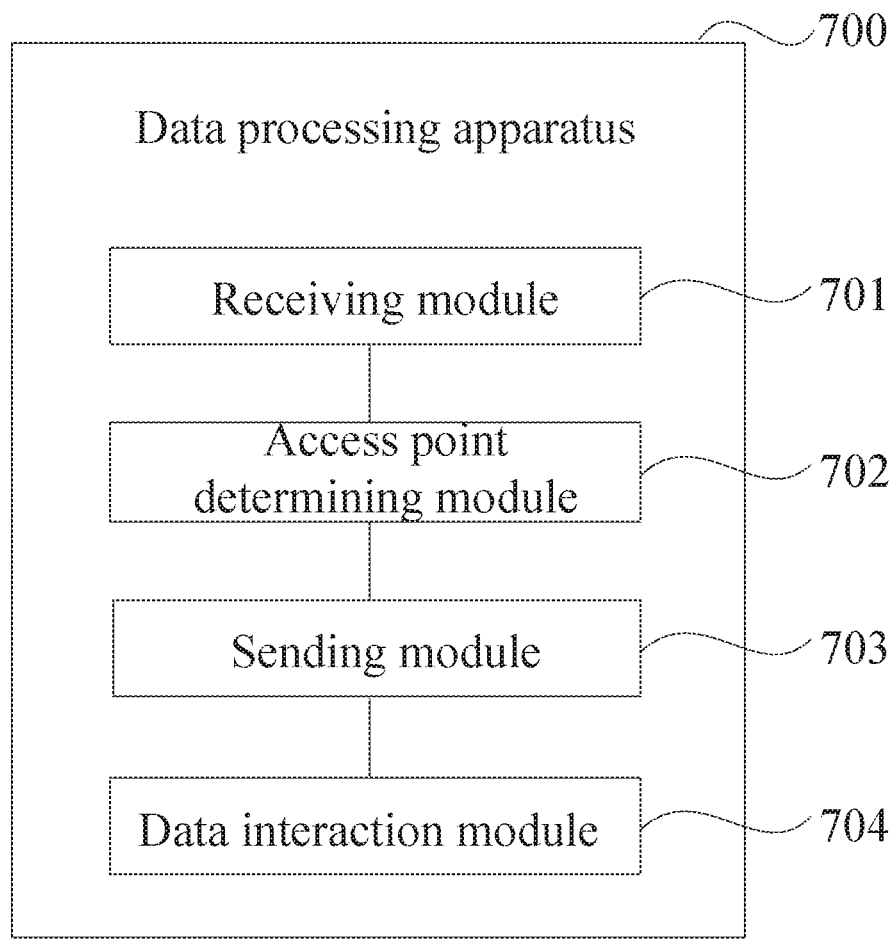
FIG. 7 is a block diagram of a data processing apparatus shown according to an exemplary embodiment.

Please refer to FIG. 7, based on the same inventive concept, the present disclosure provides a data processing apparatus 700, and the data processing apparatus 700 is applied to a terminal, including:

a receiving module 701, configured to receive an application access request;

an access point determining module 702, configured to determine a target access point corresponding to the application access request according to a mapping relationship between the access point and an application server obtained from a blockchain network;

a sending module 703, configured to send a software defined perimeter SDP authentication request to the target access point; and a data interaction module 704 configured to, after the SDP authentication succeeds, perform interaction of application data through a data channel established with the target access point, wherein the data channel has a period of validity of a preset time length.

Optionally, the data interaction module 704 is further configured to:

after the interaction of application data is performed through the data channel established with the target access point, when the application access request is received again, if the data channel is not out of date, perform the interaction of the application data through the data channel; or after the interaction of application data is performed through the data channel established with the target access point, when the application access request is received again, if the data channel is out of date, re-execute the step of sending the software defined perimeter SDP authentication request to the target access point to re-establish the data channel.

Optionally, the apparatus further includes:

a key determining module, configured to determine a key for performing data interaction with the target access point; and the data interaction module 704 is configured to:

use the key to send encrypted application data to the target access point through the data channel.

Optionally, the key determining module includes:

a key determining sub-module configured to, when the terminal locally stores the key and the key is not out of date, determine the locally stored key as the key for performing data interaction with the target access point; and a key negotiation module configured to, when the key stored locally by the terminal is out of date or the key is not stored locally, negotiate the key with the target access point, determine the negotiated key as the key for performing data interaction with the target access point, and store the key in the local of the terminal.

Optionally, the apparatus further includes:

an obtaining module, configured to obtain the mapping relationship between the access point and the application server from the blockchain network, and access point information of each access point, the access point information at least includes a public key of the access point, an IP address and port information;

the sending module 703 is configured to:

send the SDP authentication request to the target access point according to the IP address and the port information of the target access point; and the key negotiation module is configured to:

perform key negotiation with the target access point through the public key of the target access point.

Optionally, the key negotiation module includes:

an identity authentication module, configured to perform identity authentication on the target access point through the public key of the target access point;

a key generation module configured to, when the identity authentication of the target access point is passed, the identity authentication of the target access point on the terminal is passed, and the target access point confirms that the blockchain network stores the permission information of the terminal, generate the key to complete the key negotiation;

wherein the permission information is used for characterizing that the terminal is allowed to access the target access point.

Figure 8:
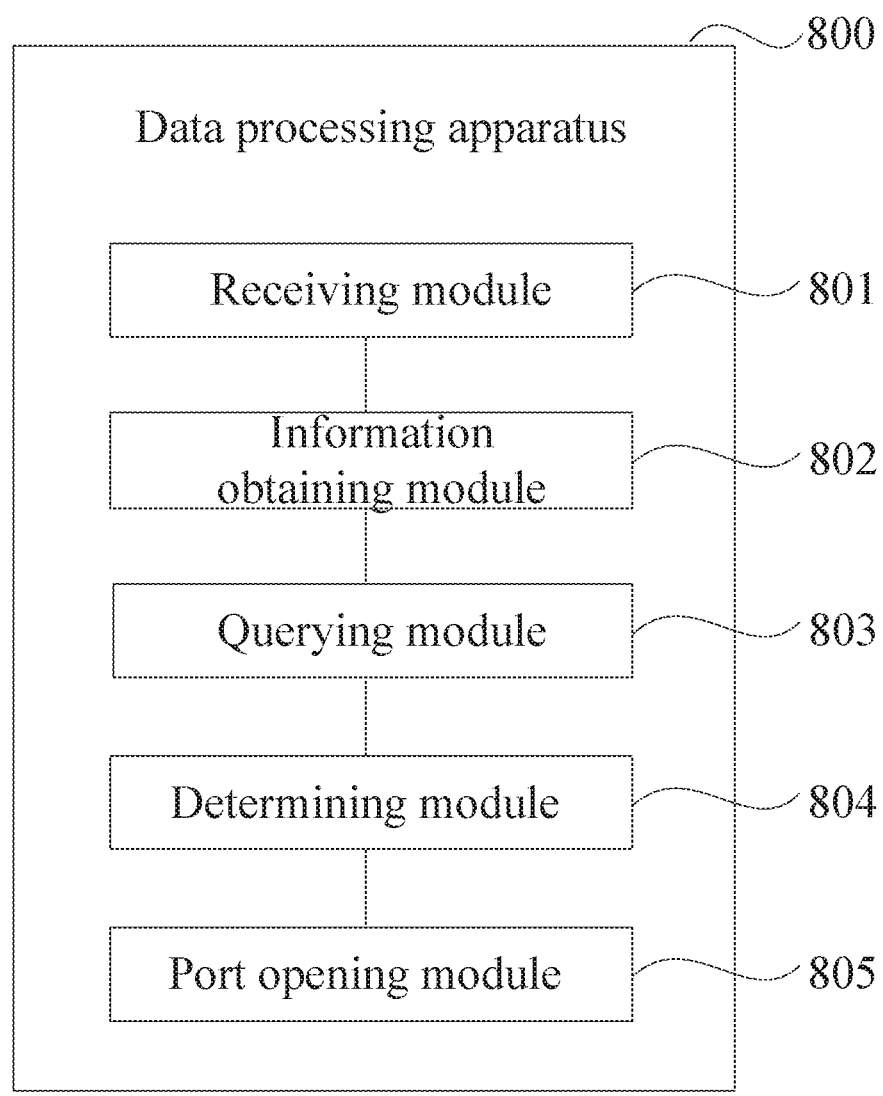
FIG. 8 is a block diagram of a data processing apparatus shown according to an exemplary embodiment.

Please refer to FIG. 8, based on the same inventive concept, the present disclosure provides a data processing apparatus 800, and the data processing apparatus 800 is applied to an access point, including:

a receiving module 801, configured to receive a software defined perimeter SDP authentication request sent by a terminal;

an information obtaining module 802, configured to obtain identity information of the terminal from the SDP request;

a querying module 803, configured to query whether permission information allowing the terminal is stored in the blockchain network according to the identity information, the permission information is used for characterizing that the terminal is allowed to access the target access point;

a determining module 804, configured to determine that the SDP authentication is successful, when the permission information is queried in the blockchain network; and a port opening module 805, configured to open a port to the terminal to establish a data channel with the terminal, and perform interaction of application data through the data channel.

Optionally, the port opening module 805 is configured to:

open the port to the terminal, and set an open period of the port, so that the data channel has a period of validity of a preset time length.

Wherein, after the data channel is out of date, the terminal needs to perform the SDP authentication again.

With regard to the apparatus in the above embodiments, the specific manners of the respective modules to execute operations have been described in detail in the embodiments related to the method, and thus will not be explained in detail herein.

In another exemplary embodiment, a computer program product is further provided, the computer program product includes a computer program executable by a programmable apparatus, and the computer program has a code part for executing the data processing method mentioned above when being executed by the programmable apparatus.

In another exemplary embodiment, a non-transitory computer readable storage medium including instruction is further provided, the non-transitory computer readable storage medium includes one or more programs, and the one or more programs are used for executing the data processing method mentioned above.

In another exemplary embodiment, a terminal is further provided, including: a non-transitory computer readable storage medium; and one or more processors for executing programs in the non-transitory computer readable storage medium; and the non-transitory computer readable storage medium stores instructions for executing the data processing method applied to the terminal.

In another exemplary embodiment, an access point computer is further provided, including: a non-transitory computer readable storage medium; and one or more processors for executing programs in the non-transitory computer readable storage medium; and the non-transitory computer readable storage medium stores instructions for executing the data processing method applied to the access point computer.

In the embodiments provided by the present disclosure, it should be understood that the disclosed apparatus and method can be implemented in other manners. For example, the apparatus embodiments described above are merely illustrative. For example, the division of the modules or units is only a logical function division, in actual implementation, there may be another division manner, for example, multiple units or components can be combined or integrated into another system, or some features can be ignored or not executed.

Various functional modules in the various embodiments of the present application can be integrated into one processing unit, the various modules can also exist physically separately, or two or more modules can be integrated into one unit. The above integrated unit can be implemented in the form of hardware and can also be implemented in the form of a software functional unit.

If the integrated unit is implemented in the form of the software functional unit and is sold or used as an independent product, it can be stored in a computer readable storage medium. Based on this understanding, the technical solutions of the present application substantially, or the part contributing to the prior art, or a part or all of the technical solutions can be embodied in the form of a software product, the computer software product is stored in a storage medium, and includes a plurality of instructions enabling a computer device (can be a personnel computer, a server, or a network device or the like) or a processor (processor) to execute all or a part of the steps of the methods in the various embodiments of the present application. The foregoing storage medium includes a variety of medium capable of storing program codes, such as a USB flash disk, a mobile hard disk, an ROM (Read-Only Memory), an RAM (Random Access Memory), a magnetic disk, an optical disk or the like.

The above embodiments are only used for describing the technical solutions of the present disclosure in detail, but the description of the above embodiments is only used for helping to understand the method of the present disclosure and its core ideas, and should not be construed as limiting the present disclosure. Modifications or replacements easily conceivable to those skilled in the art within the technical scope disclosed by the present disclosure shall all fall within the protection scope of the present disclosure.

The invention claimed is:

1. A data processing method, applied to a terminal, comprising:
   receiving an application access request;
   determining a target access point corresponding to the application access request according to a mapping relationship between the access point and an application server obtained from a blockchain network;
   sending a software defined perimeter SDP authentication request to the target access point; and
   after the SDP authentication succeeds, performing interaction of application data through a data channel established with the target access point, wherein the data channel has a period of validity of a preset time length;
   wherein the method further comprises determining a key for performing data interaction with the target access point;
   wherein the performing interaction of application data through a data channel established with the target access point comprises using the key to send encrypted application data to the target access point through the data channel;
   wherein the determining a key for performing data interaction with the target access point comprises: if the terminal locally stores the key and the key is not out of date, determining the locally stored key as the key for performing data interaction with the target access point; or, if the key stored locally by the terminal is out of date or the key is not stored locally, negotiating the key with the target access point, determining the negotiated key as the key for performing data interaction with the target access point, and storing the key in the local of the terminal;
   wherein the method further comprises obtaining the mapping relationship between the access point and the application server from the blockchain network, and access point information of each access point, the access point information at least comprises a public key of the access point, an IP address and port information;
   wherein the sending a software defined perimeter SDP authentication request to the target access point comprises sending the SDP authentication request to the target access point according to the IP address and the port information of the target access point;
   wherein the negotiating the key with the target access point comprises performing key negotiation with the target access point through the public key of the target access point;
   wherein the performing key negotiation with the target access point through the public key of the target access point comprises: performing identity authentication on the target access point through the public key of the target access point; when the identity authentication of the target access point is passed, the identity authentication of the target access point on the terminal is passed, and the target access point confirms that the blockchain network stores the permission information of the terminal, generating the key to complete the key negotiation; wherein the permission information is used for characterizing that the terminal is allowed to access the target access point.

2. The method according to claim 1, wherein after the performing interaction of application data through a data channel established with the target access point, the method further comprises:
   when the application access request is received again, if the data channel is not out of date, performing the interaction of the application data through the data channel; or
   when the application access request is received again, if the data channel is out of date, re-executing the step of sending the software defined perimeter SDP authentication request to the target access point to re-establish the data channel.

3. A non-transitory computer readable storage medium, wherein the non- transitory computer readable storage medium comprises one or more programs, and the one or more programs are used for executing the method in claim 1.

4. A terminal, comprising:
   a non-transitory computer readable storage medium; and
   one or more processors for executing programs in the non-transitory computer readable storage medium; and the non-transitory computer readable storage medium stores instructions for executing the method in claim 1.

* * * * *